United States Patent [19]

Mapelli et al.

[11] Patent Number: 4,810,081
[45] Date of Patent: Mar. 7, 1989

[54] BINOCULAR SPECTACLES

[75] Inventors: Rudy Mapelli, Madison; Donald S. Eisenberg, Middleton, both of Wis.; Geoffrey S. Moss, Weston, Conn.; David K. Hendrickson; Connie M. Mapelli, both of Madison, Wis.

[73] Assignee: C-Clear, Ltd., Madison, Wis.

[21] Appl. No.: 103,505

[22] Filed: Oct. 1, 1987

[51] Int. Cl.$^4$ .............................................. G02C 7/08
[52] U.S. Cl. ...................................... 351/57; 351/158
[58] Field of Search ....................... 351/57, 58, 59, 47, 351/48, 158

[56] References Cited

U.S. PATENT DOCUMENTS

| | | |
|---|---|---|
| 945,078 | 1/1910 | Beebe . |
| 1,562,046 | 11/1925 | Perrin . |
| 2,017,233 | 10/1935 | Chester . |
| 2,155,575 | 6/1937 | Wittig . |
| 2,422,661 | 6/1947 | Ellis . |
| 2,459,021 | 1/1949 | Frommer . |
| 2,642,776 | 6/1953 | Boeder . |
| 2,759,395 | 8/1956 | Wofford ............................. 351/57 |
| 2,978,955 | 6/1961 | Frommer . |
| 3,045,544 | 7/1962 | Schmidt . |
| 3,741,634 | 6/1973 | Stoltze . |

OTHER PUBLICATIONS

Copy of page from a Product Manual Showing "Edroy" and Wingate Binocular Type Magnifiers (name of product manual unknown).

Primary Examiner—Rodney B. Bovernick
Attorney, Agent, or Firm—Lathrop & Clark

[57] ABSTRACT

Binocular spectacles which include at least one post with means for adjusting the length of the post. The spectacles include means connected to each post for attaching the post to the eyeglasses. A rear hinge hingedly connects each post to the post attaching means so that the post can pivot through a vertical plane with respect to the eyeglasses. Additionally, the binocular spectacles have a spectacle portion with two lenses. The spectacle portion is connected to each post by a front hinge so it can be pivoted through a vertical plane with respect to the posts. The hinges of the binocular spectacles and the adjustable length of the posts allow the spectacles to be compacted into a small volume. Preferably, the lenses of the spectacle portion are easily interchangeable.

9 Claims, 3 Drawing Sheets

BINOCULAR SPECTACLES

BACKGROUND OF THE INVENTION

1. Field of the Invention

The present invention relates to binocular spectacles which are used in combination with eyeglasses to enable the user to see small objects or print.

2. Description of Prior Art

Various types of binocular spectacles have been developed for use in conjunction with eyeglasses. Examples of such binocular spectacles are disclosed in U.S. Pat. Nos. 3,741,634 to Stoltze, 2,972,955 to Frommer, and 945,078 to Beebe. The patent to Frommer discloses a detachable mount for optical devices using a frame and hook arrangement. The patent to Stoltze discloses binocular spectacles with a single central post which is hingedly connected to both the mounting wire and to the lenses. The patent to Beebe discloses posts which are adjustable in length to allow for adjustment of the focal length of the spectacles. Additionally, spectacles have been made which include a clip by which they are mounted onto eyeglasses.

It is desirable that binocular spectacles be foldable and shortenable so that they can be compacted for storage. It is also desirable that the lenses of the spectacles be easily interchangeable. In conjunction with these advantages it is also desirable that the focal length be adjustable, and that the user easily be able to move the lenses out of the line of sight.

SUMMARY OF THE INVENTION

The present invention provides for improved binocular spectacles which may be used in conjunction with eyeglasses. The preferred binocular spectacles include a post which includes means for adjusting the length of the post. The post length adjusting means includes a sleeve portion of the post, a shaft portion of the post which is at least partially enclosed by the sleeve portion and which moves telescopically forwardly and rearwardly with respect to the sleeve portion to selectively determine the length of the post, and means for locking the length of the post. The preferred binocular spectacles further include a post attaching means formed from a clip which includes a forward part with a front grip end two front prongs descending therefrom, and a rearward part which is hingedly connected to the forward part. The rearward part has a rear grip and two rear prongs descending therefrom. The clip further has means for biasing the front prongs and rear prongs toward each other so that the eyeglasses can be held therebetween and the clip can be disengaged by pressing the front and rear grips together. The post is connected to the clip by a rear hinge which allows the post to pivot in a vertical plane with respect to the clip and eyeglasses.

The preferred binocular spectacles further include a spectacle portion which includes two lenses. The binocular spectacles also include a front hinge which is comprised of a lateral pin of selected diameter which is connected to a top of the spectacle portion, and a clasp which is connected to a front of the shaft portion of the post. The clasp includes two downwardly extending opposing resilient finger portions which form a lateral hole for receiving the pin. The lateral hole has a diameter which is slightly smaller than that of the pin so that the finger portions which form a lateral hole resist any pivoting of the pin and spectacle portion. The finger portions also form a notch which extends downwardly from the hole to allow the pin to be inserted into and removed from the hole. Between the hole and the notch, the finger portions form a narrowed neck which has a width smaller than the hole diameter to inhibit removal of the lateral pin from the hole. Thus the pin generally will be removed from the hole only when there is an intention on the part of the user to do so.

The front and rear hinge of the preferred binocular spectacles and the telescopic movement of its post sleeve portion and post shaft portion allow the binocular spectacles to be folded and shortened so that they may be stored in a compact volume. In addition, the design of the second hinge, which comprises a clasp with lateral hole and notch for receiving the lateral pin which is connected to the spectacle portion, ensures simple and efficient interchangeability of the lenses. At the same time, these advantages allow the focal length of the binocular spectacles to be adjusted and allow the user to remove the lenses from the line of sight without removing the binocular spectacles from his or her eyeglasses.

An alternative embodiment of the binocular spectacles includes two posts which each are comprised of a rear post part including a first sleevelet at a front end of the rear post part, and a front post part which is resistively slidable through the first sleevelet. The front post part also includes a second sleevelet at a rear end of the front post part. The rear post part is resistively slidable through the second sleevelet so that the rear and front post parts are slidable with relationship to one another to thereby allow the length of post to be adjusted. The alternative binocular spectacles also include means for attaching the posts to the eyeglasses. The post attaching means comprises an integral frame which is bent to form a top portion and two side portions which conform approximately in shape to a top and sides of eyeglasses, at least one top hook which extends rearwardly from the top portion of the frame and then extends downwardly so as to be adapted to extend rearwardly over the top of the eyeglasses and then downwardly over the back of the eyeglasses to hold and mount the frame to the front of the eyeglasses, and two side wire hooks which each extends rearwardly from one side portion of the frame and then laterally inwardly so that each side hook is adapted to extend rearwardly over the side of the eyeglasses and laterally inwardly over the back of the eyeglasses to maintain the frame in position on the front of the eyeglasses. The alternative binocular spectacles further include a spectacle portion with two lenses, a rear hinge on each post which connects the post to the top portion of the frame so that each post can pivot through a vertical plane with respect to the frame, and a front hinge on each post which hingedly connects the post to the spectacle portion so that the lenses can pivot in a vertical plane with respect to the posts.

The rear and front hinges of the alternative binocular spectacles allow the spectacles to be folded nearly flat. Additionally, the telescopic inter-relationship between the front and rear post parts allow the alternative binocular spectacles to be shortened. These two features allow the alternative binocular spectacles to be compacted so that they may be stored in a small volume. These features also allow for adjustment of the focal length and for removal of the lenses from the line of sight of the user without removing the binocular spectacles from the user's eyeglasses.

Further objects features, and advantages of the invention will be apparent from the following description when taken in conjunction with the accompanying drawings.

DESCRIPTION OF THE PREFERRED EMBODIMENTS

Figures 1, 2:
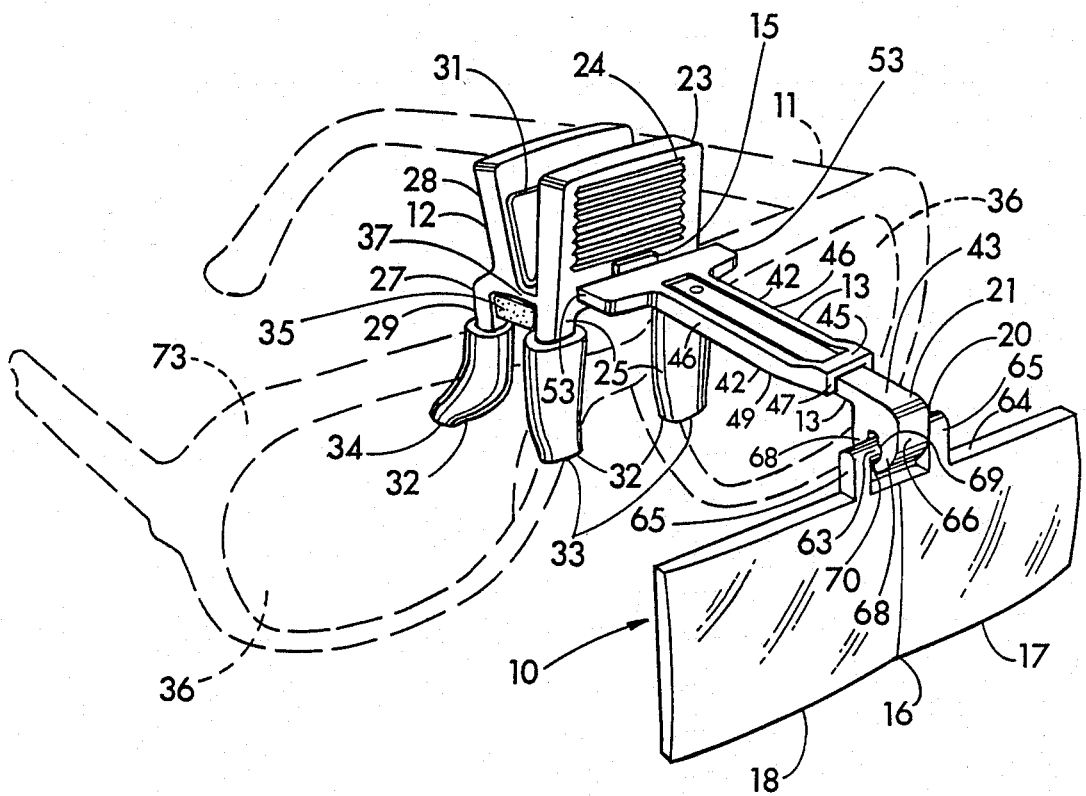
FIG. 1 is a perspective view of the preferred binocular spectacles which are mounted on the glasses shown in dashed lines.
FIG. 2 is a side elevation view of the preferred binocular spectacles of FIG. 1 showing the spectacle portion provided upwardly in dashed lines.

With reference to the drawings, preferred binocular spectacles 10, which are mounted to the eyeglasses shown in dashed lines at 11, are shown generally in FIG. 1. The binocular spectacles 10 include a single post 13, a clip 12 which attaches the post 13 to the eyeglasses 11, a rear hinge 15 which hingedly connects the post 13 to the clip 12 so that the post 13 can pivot upwardly or downwardly in a vertical plane, and a spectacle portion 16 with two lenses 17 and 18 which are preferably comprised of a single piece of polycarbonate plastic. The binocular spectacles 10 further include a front hinge 20 which is located at the front end 21 of the post 13. The front hinge 20 hingedly connects the post 13 to the spectacle portion 16 so that the lenses 17 and 18 can pivot through a vertical plane with respect to the post 13.

Figure 3:
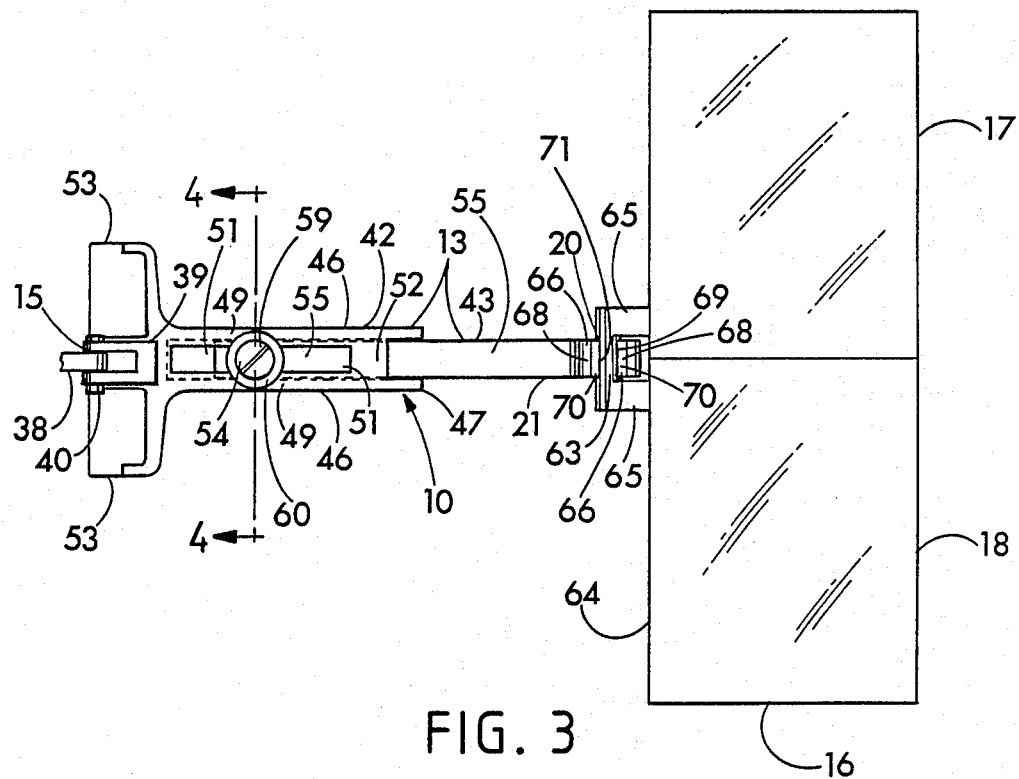
FIG. 3 is a partial bottom elevation view of the preferred binocular spectacles, with the spectacle portion pivoted upwardly as shown in dashed lines in FIG. 2.

The clip 12, which forms the means for attaching the post 13 to the eyeglasses 11, includes a forward part 23 with a front grip 24 and two front prongs 25 descending therefrom; and a rearward part 27 which is hingedly connected to the forward part 23, and which has a rear grip 28 and two rear prongs 29 which descend therefrom. A V-shaped spring 31 is connected to and located between the front grip 24 and rear grip 28 to bias the front prongs 25 and the rear prongs 29 toward each other so that the prongs 25 and 29 pinch against the eyeglasses 11 as shown in FIGS. 1 and 2. A cushion 35 underlies the hinge 37 between the prongs 25 and 29 to provide protection to the eyeglasses 11 when the clip 12 is placed thereon. The preferred clip 12 further includes four tube-like flexible boots 32 which are each fitted over the end 33 or 34 of a prong 25 or 29 to protect the eyeglasses 11 which are pinched between the prongs 25 and 29. In particular, the boots 32 protect the eyeglass lenses 36 from being scratched by the prongs 25 and 29. The end 33 or 34 of each prong 25 or 29 is ribbed as shown in FIG. 2 in partial section to resist removal of flexible boot 32. The clip 12 can be disengaged from the eyeglasses 11 by pressing the front grip 24 and rear grip 28 together so that the front prongs 25 and the rear prongs 29 move away from each other. As shown in FIGS. 2 and 3, the post 13 is connected to the forward part 23 of the clip 12 by the rear hinge 15. The first rear hinge part 38 is connected to the forward part 23 of the clip 12 and the second rear hinge part 39 is connected to the post 13. A pin 40 connects the first and second rear hinge parts 38 and 39 and allows the hinge parts 38 and 39 and their connected parts to pivot with respect to each other.

Figure 4:
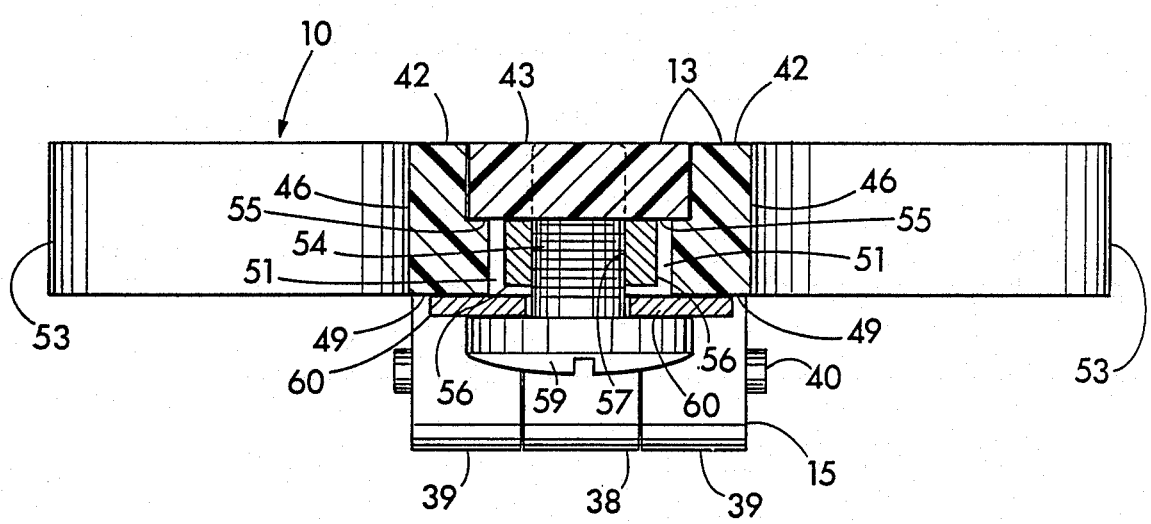
FIG. 4 is a cross-sectional view taken along section line 4—4 of FIG. 3.

The post 13 is comprised chiefly of a sleeve portion 32 of the post 13, and a shaft portion 43 of the post 13 which is partially enclosed by the sleeve portion 42 and which moves telescopically forwardly and rearwardly with respect to the sleeve portion 42 to selectively determine the length of the post 13. The sleeve portion 42 is substantially channel-shaped to open upwardly as shown in FIGS. 1 and 4 and includes a top bridge portion 45 which extends between the two sides 46 of the sleeve portion 42 to overlie the shaft portion 43 at the front end 47 of the sleeve portion 42 as shown in FIGS. 1 and 2. As shown in FIGS. 3 and 4, a longitudinal slot 51, which has a width which is less than the width of the shaft portion 43 of the post 13, is formed at the bottom 49 of the sleeve portion 42. The narrowness of the longitudinal slot 51 with respect to the shaft portion 43 ensures that the shaft portion 43 will not pass downwardly through the slot 51 is the shaft portion 43 is pulled downwardly toward the slot 51. The shaft portion 43 instead will rest against the bottom 49 of the sleeve portion 42. The front end of the slot 51 is formed by a bottom bridge portion as shown at 52 in FIG. 3.

The telescopic inter-relationship between the sleeve portion 42 of the post 13 and the shaft portion 43 of the post 13 allows the length of the post 13 to be adjusted. Once the desired length is selected, that length may be locked by tightening the screw 54 as shown in FIGS. 2-4. Descending from the shaft bottom 55 is a small sleeve 56 having a threaded bore 57 as shown in FIG. 4. The small sleeve 56 descends through the longitudinal slot 51 to receive the screw 54 with a screwhead 59 which is wider than the slot 51 width. Entrained on the screw 54 is a plastic washer 60 which is positioned between the bottom 49 of the sleeve portion 42 and the screwhead 59. When the screw 54 is tightened by turning, the plastic washer 60 is forced upwardly, and the shaft bottom 55 is forced downwardly so that the sleeve portion 42 which is adjacent the slot 51 is pinched between the screwhead 54 with plastic washer 60 and the shaft bottom 55 to thereby lock the position of the shaft portion 43 with respect to the sleeve portion 42. When the screw is loosened, the sleeve portion 42 as shaft portion 43 are able to slide rearwardly and forwardly again with respect to one another.

A front hinge 20 connects the shaft portion 43 of the post 13 to the spectacle portion 16. The front hinge 20 of the preferred binocular spectacles 10 includes a lateral pin 63 which has a selected diameter and which is connected to a top 64 of the spectacle portion 16 by the integral member 65, and a clasp 66 which receives the lateral pin 63 and which is connected to the front 21 of the shaft portion 43. The clasp 66 includes two downwardly extending opposing resilient finger portions 68 which form a lateral hole 69 for receiving the pin 63. The lateral hole 69 has a diameter which is slightly smaller than that of the pin 63 so that the finger portions 68 slightly resist pivoting of the pin 63 and spectacle portion 16. Thus, gravitational force acting on the spectacle portion 16 alone will not suffice to pivot the spectacle portion 16 with respect to the post 13. The spectacle portion 16 therefore will maintain its pivotal position until the user selectively changes that position. The finger portions 68 also form a notch 70 which extends from the lateral hole 69 downwardly to allow the pin 63 to be inserted into and removed from the hole 69. Between the hole 69 and the notch 70, the finger portions 68 form a narrowed neck 71. The neck 71 has a width that is smaller than the hole 69 diameter to inhibit removal of the pin 63 from the hole 69. It is therefore unlikely that the spectacle portion 16 and lateral pin 63 would be accidentally removed from the clasp 66. To remove the lateral pin 63 from the lateral hole 69, the spectacle portion 16 must be firmly grasped and pulled downwardly away from the clasp so that the pin 63 snaps through the narrowed neck 71 and out through the notch 70. In a similar manner, the lateral pin 63 is inserted into the lateral hole 69 by first inserting the pin 63 into the notch 70 and then firmly pushing the pin 63 upwardly and snapping it through the narrowed neck 71 into the lateral hole 69.

The clip and post of the preferred binocular spectacles are made substantially of transparent or translucent plastic. Alternatively, they could be made from an opaque plastic, metal, or some other material.

In their use, the preferred binocular spectacles 10 are intended to serve primarily as a binocular magnifying glass which can be utilized by persons already wearing eyeglasses. The binocular spectacles 10 are particularly suited for reading small print or working with small parts such as jewelry. To attach the binocular spectacles 10 to eyeglasses, the user simply grasps the front grip 24 and rear grip 28 between his/her fingers, squeezes and places the prongs 25 and 29 over the eyeglasses 11 so that the cushion 35 rests on the top 73 of the eyeglasses 11 with the rear prongs 30 in back of the eyeglasses 11, and the front prongs 25 in front of the eyeglasses 11. The user then may release the grips 24 and 28 so that the prongs 25 and 29 with their flexible boots 32 pinch and rest against the eyeglasses 11. Once the binocular spectacles 10 are attached to the eyeglasses 11, the desired focal length should be selected. The focal length of the spectacles 10 is changed when the length of the post 13 is adjusted by moving the shaft portion 43 with respect to the sleeve portion 42. Once the post 13 is adjusted to its desired length, the screw 54 may be turned and tightened to lock the relative positions of the sleeve portion 42 and shaft portion 43. If the user desires the change those positions again, the screw 54 must be loosened.

During use, the user may find it necessary to change the lenses 17 and 18 if the user requires greater or lesser magnification. This is accomplished by pulling down on the spectacle portion 16 while holding the post 13. With sufficient pulling force, the pin 63 will snap out from the lateral hole 69 through the narrowed neck 71 and out the notch 70. A new spectacle portion with different lenses may then be attached to the clasp 66 by inserting the lateral pin 63 into the notch 70 and pushing the spectacle portion 16 upwardly so that the lateral pin 63 snaps through the narrowed neck 71 into the lateral hole 69. If during use the user desires to move the lenses 17 and 18 out of his/her line of sight, this may be accomplished by either pivoting the post 13 and spectacle portion 16 upwardly at the rear hinge 15 by grasping the post wide portion 53, or by pivoting the spectacle portion 16 upwardly at the front hinge 20 as shown in FIGS. 2 and 3. The rear and front hinges 15 and 20 along with the telescoping post 13 alllow the preferred binocular spectacles 10 to be folded up into a relatively small volume for storage.

Figure 5:
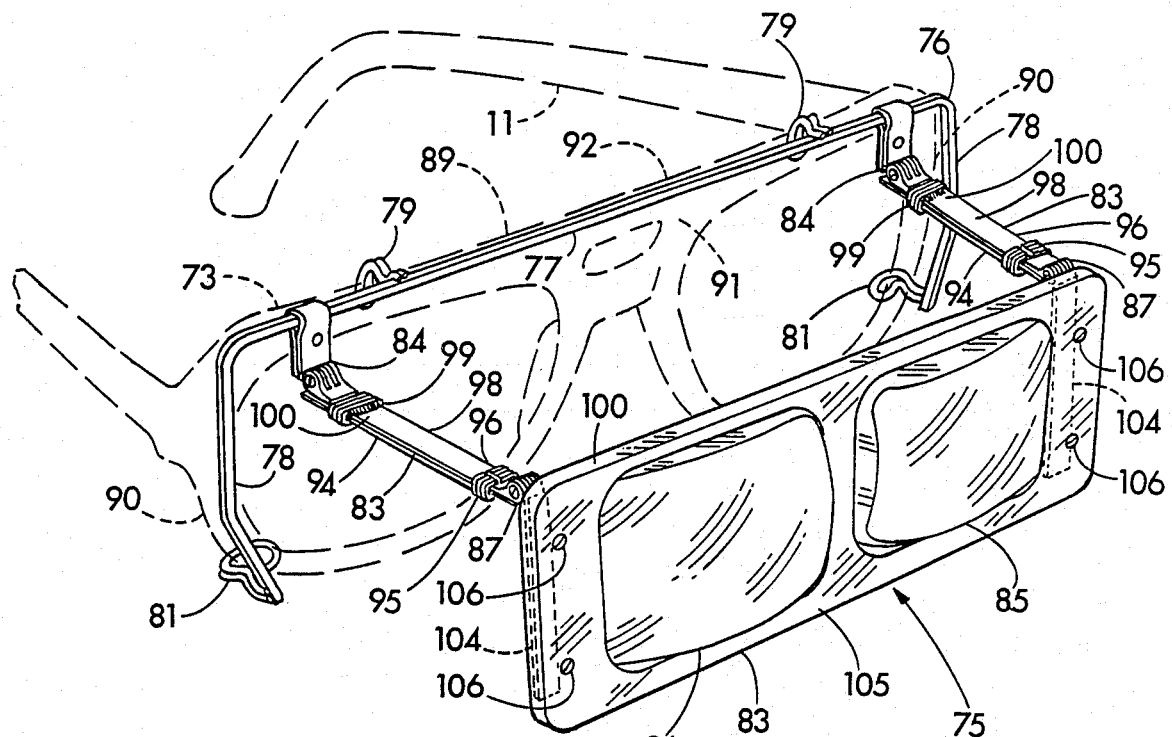
FIG. 5 is a perspective view of an alternative embodiment of binocular spectacles mounted to the eyeglasses shown in dashed lines.

With reference to the drawings, an alternative embodiment of the binocular spectacles 75, which is attached to the eyeglasses shown in dashed lines at 11, is shown generally in FIG. 5. The alternative binocular spectacles 75 include an integral wire frame 76 which is bent to form a top portion 77 and two side portions 78, two wire top hooks 79 which extend rearwardly from the top portion 77 of the frame 76 and then extend downwardly, two wire side hooks 81 which each extends rearwardly from one side portion 78 of the frame 76 and then extends laterally inward, two posts 82 which are each attached to and extend from the top portion 77 of the frame 76 near the side portion thereof, and a rear hinge 84 connected to each post 82 which hingedly connects the post 82 to the top portion 77 of the wire frame 76. The alternative binocular spectacles 75 also include a spectacle portion 83 having two lenses 85 and 86, and two front hinges 87, each of which is connected to one post 82 and to the spectacle portion 83 thereby hingedly connecting the spectacle portion 83 to the posts 82.

The wire frame 76 and wire hooks 79 and 81 together comprise the means for attaching the post 82 to the eyeglasses 11. The top portion 77 and side portion 78 of the wire frame 76 are bent to conform approximately in shape to a top 89 and sides 90 of the eyeglasses 11. The frame 76 is thus adapted to be mounted to a front 91 of the eyeglasses 11 by the hooks 79 and 81. Each of the two top wire hooks 79 are adapted to extend rearwardly over the top 89 of the eyeglasses 11 and downwardly over a back 92 of the eyeglasses 11 to hold the frame 76 to the front 91 of the eyeglasses 11. In a similar manner, the two side wire hooks 81 each are adapted to extend rearwardly over the side 90 of the eyeglasses 11 and then laterally inward over the back 92 of the eyeglasses 11 to thereby hold the frame 76 to the eyeglasses 11 and to prevent lateral shifting of the frame 76.

Each post 82 includes a rear post part 94 having a first sleevelet 95 connected to the front end 96 of the rear post part 94, and a front post part 98 having a second sleevelet 99 connected to the rear end 100 of the front post part 98. The front post part 98 is able to slide through the first sleevelet 95 at the same time that the rear post part 94 slides through the second sleevelet 99 to thereby adjust the length of the post 82. Both posts 82 should be adjusted in length simultaneously so that none of the post parts becomes jammed in the sleevelets 95 and 99.

Figure 6:
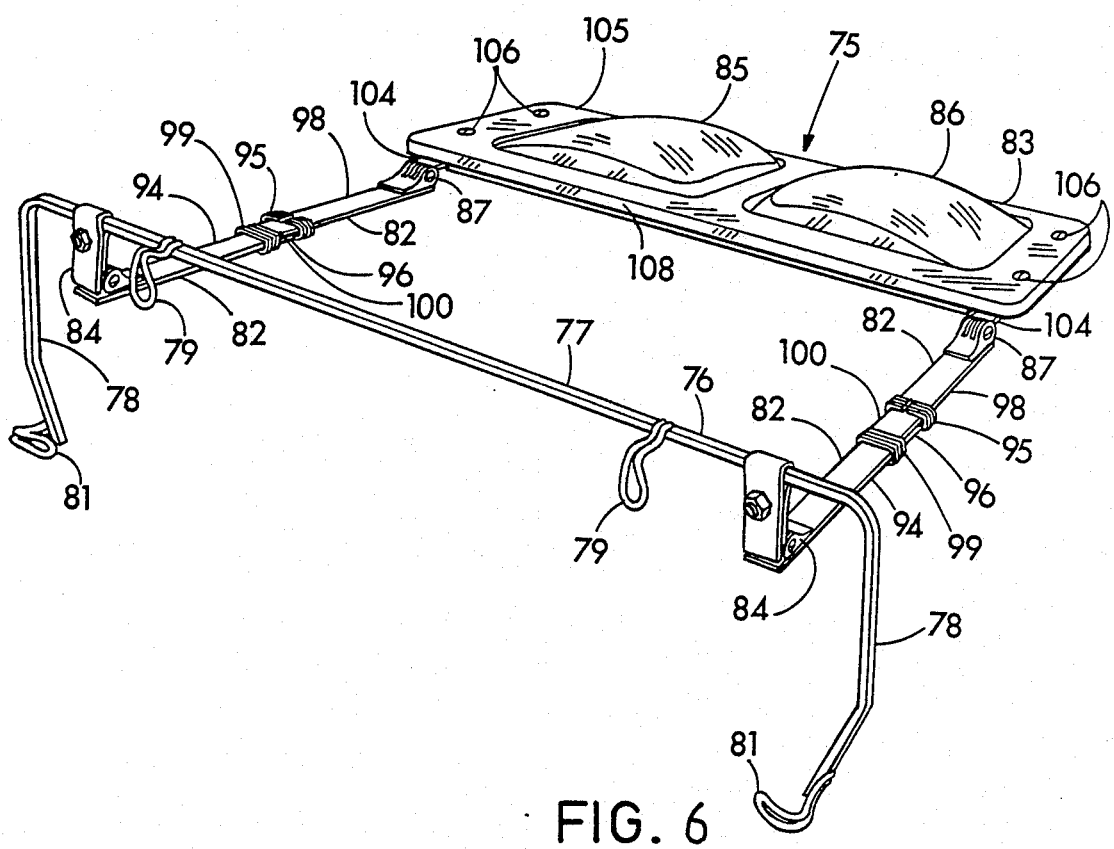
FIG. 6 is a rear perspective view of the alternative binocular spectacles, showing the spectacle portion pivoted upwardly and the two posts extended almost to full length.

Each of the two rear hinges 84 are connected to the top portion 77 of the wire frame 76, and to the back end 101 of a rear post part 94. The rear hinges 84 allow the posts 82 to be pivoted in a vertical plane with respect to the wire frame 76. The two front hinges 87 are each connected to the front end 103 of the front post part 98 and to a metal member 104 which is screwed to the plastic frame 105 of the spectacle portion 83 by the screws 106. Each metal member 104 is attached to the plastic frame 105 and each front hinge 84 is connected to a metal member 104 near the top 108 of the spectacle portion 83. The spectacle portion 83 includes the two lenses 85 and 86, the plastic frame 105 which holds the lenses, and the metal members 104 which are attached to the plastic frame 105 by the screws 106. As shown in FIG. 6, the spectacle portion 83 can be pivoted in a vertical plane with respect to the posts 82.

In their use, the alternative binocular spectacles 75 are also intended to be used as a binocular magnifying glass by users who already have eyeglasses 11. To use the alternative binocular spectacle 75, the user simply places the frame 76 and hooks 79 and 81 over his/her eyeglasses 11 so that the hooks 79 and 81 extends around to the back 92 of the eyeglasses 11 to hold the wire frame 76 to the front 91 of the eyeglasses 11. Then the focal length of the binocular spectacles 75 may be adjusted by shortening or lengthening the two posts 82 to the desired length. This is accomplished by sliding the rear post part 94 and the front post part 98 of each post 82 with respect to one another. Each of the sleevelets 95 and 99 are sized so that the rear or front post part 94 or 98 which moves through the sleevelet 95 or 99 slides against the frictional resistance force of the sleevelet 95 or 99. Thus, once a desired post 82 length is attained, the posts 82 remain that length until intentionally changed by the user.

The rear hinges 84 allow the user to pivot the two posts 82 and spectacle portion 83 out of the line of sight of the user. The front hinges 87 allow the user to clear his/her line of sight by pivoting only the spectacle portion 83 upwardly out of his/her line of sight as shown in FIG. 6. Both the rear and front hinges 84 and 87 allow the user to fold the alternative spectacles 75 so that a relatively small volume is required for storing the spectacles 75. If the user desires to change the lenses 85 and 86 to stronger or weaker lenses, the plastic frame 105 can be removed from the metal members 104 by removing the screws 106. New lenses which are already inserted into another plastic frame may then be screwed into the metal members 104.

It is understood that the invention is not confined to the particular construction and arrangement herein illustrated and described, but embraces such modified forms thereof as come within the scope of the following claims.

What is claimed is:

1. Binocular spectacles, for disengagable attachment to eyeglasses, comprising:
    (a) at least one post, each post including means for adjusting the length of the post; wherein the post length adjusting means comprises:
        (i) a channel-shaped sleeve portion of the post;
        (ii) a shaft portion of the post which is at least partially enclosed by the sleeve portion and which moves telescopically forwardly and rearwardly with respect to the sleeve portion to selectively determine the length of the post; and
        (iii) means for locking the length of the post;
    (b) means connected to each post for attaching the post to the eyeglasses;
    (c) a rear hinge on each post, each rear hinge hingedly connecting the post to the post attaching means so that the post can pivot in a vertical plane;
    (d) a spectacle portion comprising at least one lens; and
    (e) a front hinge for each post, each front hinge hingedly connecting the post to the spectacle portion, so that the lenses can pivot in a vertical plane with respect to the posts.

2. The binocular spectacles of claim 1 wherein the sleeve portion of the post has a longitudinal slot having a width less than a width of the shaft portion of the post; and wherein the post length locking means comprises a screw which screws into a threaded bore on the shaft portion and which extends through the slot, the screw having a head which is wider than the slot width so that when the screw is tightened, the sleeve portion adjacent the slot is pinched between the screw head and shaft portion to lock the position of the shaft portion with respect to the sleeve portion.

3. The binocular spectacles of claim 1 wherein the spectacle portion includes two lenses which are comprised of a single piece of material, and wherein the front hinge comprises:
    (a) a lateral pin of selected diameter which is connected to a top of the spectacle portion; and
    (b) a clasp which is connected to a front of the shaft portion, the clasp including two downwardly extending opposing resilient finger portions which form a lateral hole for receiving the lateral pin, the lateral hole having a diameter slightly smaller than that of the pin so that the finger portions resist a pivoting of the pin and spectacle portion, the finger portions also forming a notch which extends downwardly from the hole to allow the pin to be inserted into and removed from the hole, the finger portions also forming a narrowed neck between the hole and notch, which neck has a width smaller than the hole diameter to inhibit removal of the pin from the hole.

4. Binocular spectacles, for disengagable attachment to eyeglasses, comprising:
    (a) two posts, each post including means for adjusting the length of the post, and the post length adjusting means on each post comprises:
        (i) a rear post part including a first sleevelet at a front end of the rear post part;
        (ii) a front post part which is resistively slidable through the first sleevelet, the front post part including a second sleevelet at a rear end of the front post part through which the rear post part is resistively slidable, the rear part and front post part of each post being slidable with relationship to each other to selectively determine the length of the post;
    (b) means connected to each post for attaching the post to the eyeglasses, wherein the post attaching means comprises:
        (i) an integral wire frame which is bent to form a top portion and two side portions which conform approximately in shape to a top and sides of the eyeglasses, the frame being adapted to be mounted to a front of the eyeglasses;
        (ii) at least one top hook which extends rearwardly from the top portion of the frame and then extends downwardly so that the top hook is adapted to extend rearwardly over the top of the eyeglasses, and then downwardly over a back of the eyeglasses; and
        (iii) two side hooks which each extends rearwardly from one side portion of the frame and then extends laterally inward so that each side hook is adapted to extend rearwardly over the side of the eyeglasses, and then laterally inward over the back of the eyeglasses to hold the frame to the eyeglasses; wherein there are two posts which are each connected to the top portion of the integral wire frame near one side portion thereof;
    (c) a rear hinge on each post, each rear hinge hingedly connecting the post to the post attaching means at the top portion of the frame near one side portion thereof so that the post can pivot in a vertical plane;
(d) a spectacle portion comprising at least one lens; and
(e) a front hinge for each post, each front hinge hingedly connecting the post to the spectacle portion, so that the lenses can pivot in a vertical plane with respect to the posts.

5. Binocular spectacles, for disengagable attachment to eyeglasses, comprising:
(a) a post including a channel-shaped a sleeve portion of the post, a shaft portion of the post which is at least partially enclosed by the sleeve portion and which moves telescopically forwardly and rearwardly with respect to the sleeve portion to selectively determine the length of the post, and means for locking the length of the post;
(b) a clip connected to the post for attaching the post to the eyeglasses;
(c) a rear hinge on the post which hingedly connects the post to the clip so that the post can pivot in a vertical plane with respect to the clip;
(d) a spectacle portion comprising two lenses; and
(e) a front hinge which hingedly connects the post to the spectacle portion so that the lenses can pivot in a vertical plane with respect to the post.

6. The binocular spectacles of claim 5 wherein the sleeve portion of the post has a longitudinal slot having a width less than a width of the shaft portion of the post; and wherein the post length locking means comprises a screw which screws into a threaded bore on the shaft portion and which extends through the slot, the screw having a head which is wider than the slot width so that when the screw is tightened, the sleeve portion adjacent the slot is pinched between the screw head and shaft portion to lock the position of the shaft portion with respect to the sleeve portion.

7. The binocular spectacle of claim 5 wherein the two lenses of the spectacle portion are comprised of a single piece of material, and wherein the front hinge comprises:
(a) a lateral pin of selected diameter which is connected to a top of the spectacle portion; and
(b) a clasp which is connected to a front of the shaft portion, the clasp including two downwardly extending opposing resilient finger portions which form a lateral hole for receiving the lateral pin, the lateral hole having a diameter slightly smaller than that of the pin so that the finger portions resist a pivoting of the pin and spectacle portion, the finger portions also forming a notch which extends downwardly from the hole to allow the pin to be inserted into and removed from the hole, the finger portions also forming a narrow neck between the hole and notch, which neck has a width smaller than the hole diameter to inhibit removal of the pin from the hole.

8. Binocular spectacles; for disengagable attachment to eyeglasses, comprising:
(a) two posts which each include a rear post part with a first sleevelet at a front end of the rear post part, and a front post part which is resistively slidable through the first sleevelet, the front post part including a second sleevelet at a rear end of the front post part through which the rear post part is resistively slidable, the rear post part and front post part of each post being slidable with relationship to each other to selectively determine the length of the post;
(b) an integral frame connected to the posts which is shaped to form a top portion and two side portions which conform approximately in shape to a top and sides of the eyeglasses, the frame being adapted to be mounted to a front of the eyeglasses;
(c) at least one top hook which extends rearwardly from the top portion of the frame and then extends downwardly so that the top hook is adapted to extend rearwardly over the top of the eyeglasses, and then downwardly over a back of the eyeglasses;
(d) two side hooks which each extends rearwardly from one side portion of the frame and then extends laterally inward so that each side hook is adapted to extend rearwardly over the side of the eyeglasses and then laterally inward over the back of the eyeglasses to hold the frame to the eyeglasses;
(e) one rear hinge on each of the two posts, each rear hinge hingedly connecting the post to the top portion of the frame near one side portion thereof so that the post can pivot in a vertical plane with relationship to the plane;
(f) a spectacle portion including two lenses; and
(g) one front hinge for each of the two posts, each front hinge hingedly connecting the post to the spectacle portion so that the lenses can pivot in a vertical plane with respect to the posts.

9. Binocular spectacles, for disengagable attachment to eyeglasses, comprising:
(a) at least one post, each post including means for adjusting the length of the post;
(b) means connected to each post for attaching the post to the eyeglasses;
(c) a rear hinge on each post, each rear hinge hingedly connecting the post to the post attaching means so that the post can pivot in a vertical plane;
(d) a spectacle portion comprising two lenses which are comprised of a single piece of material; and
(e) a front hinge for each post, each front hinge hingedly connecting the post to the spectacle portion, so that the lenses can pivot in a vertical plane with respect to the posts; wherein the front hinge comprises:
(i) a lateral pin of selected diameter which is connected to a top of the spectacle portion; and
(ii) a clasp which is connected to a front of the shaft portion, the clasp including two downwardly extending opposing resilient finger portions which form a lateral hole for receiving the lateral pin, the lateral hole having a diameter slightly smaller than that of the pin so that the finger portions resist a pivoting of the pin and spectacle portion, the finger portions also forming a notch which extends downwardly from the hole to allow the pin to be inserted into and removed from the hole, the finger portions also forming a narrowed neck between the hole and notch, which neck was a width smaller than the hole diameter to inhibit removal of the pin from the hole.

* * * * *